US008195817B2

(12) United States Patent
Xue et al.

(10) Patent No.: US 8,195,817 B2
(45) Date of Patent: Jun. 5, 2012

(54) AUTHENTICATION OF THE GEOGRAPHIC LOCATION OF WIRELESS COMMUNICATION DEVICES

(75) Inventors: Wen Xue, Overland Park, KS (US); Douglas R. Green, Lenexa, KS (US); Arun Santharam, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 301 days.

(21) Appl. No.: 12/369,293

(22) Filed: Feb. 11, 2009

(65) Prior Publication Data
US 2010/0205316 A1 Aug. 12, 2010

(51) Int. Cl.
*G06F 15/16* (2006.01)

(52) U.S. Cl. ...... 709/229; 455/456.1; 713/180

(58) Field of Classification Search ........ 709/229, 709/223; 455/411; 380/258; 713/169, 170
See application file for complete search history.

(56) References Cited

U.S. PATENT DOCUMENTS

| | | | |
|---|---|---|---|
| 5,884,158 A | 3/1999 | Ryan et al. | |
| 6,463,534 B1 | 10/2002 | Geiger et al. | |
| 7,330,712 B2* | 2/2008 | Kirkup et al. | 455/411 |
| 7,602,281 B2* | 10/2009 | Manz et al. | 340/505 |
| 7,610,056 B2* | 10/2009 | Zapata et al. | 455/466 |
| 2001/0055392 A1* | 12/2001 | McDonnell et al. | 380/258 |
| 2002/0091925 A1* | 7/2002 | Suzuki et al. | 713/168 |
| 2003/0196084 A1 | 10/2003 | Okereke et al. | |
| 2003/0217137 A1* | 11/2003 | Roese et al. | 709/223 |
| 2004/0103283 A1 | 5/2004 | Hornak | |
| 2005/0086468 A1 | 4/2005 | Meandzija et al. | |
| 2005/0091485 A1 | 4/2005 | Imai | |
| 2006/0002556 A1 | 1/2006 | Paul | |
| 2006/0205388 A1* | 9/2006 | Semple et al. | 455/411 |
| 2007/0150723 A1 | 6/2007 | Estable et al. | |
| 2008/0096529 A1* | 4/2008 | Zellner | 455/411 |
| 2009/0091790 A1* | 4/2009 | Silverbrook et al. | 358/1.15 |
| 2010/0009656 A1* | 1/2010 | Pang et al. | 455/410 |
| 2010/0184408 A1* | 7/2010 | Vendrow et al. | 455/411 |

* cited by examiner

*Primary Examiner* — Patrice Winder
*Assistant Examiner* — Tauqir Hussain (57) ABSTRACT

What is disclosed is a method of operating a wireless communication network to authenticate a geographic location of a wireless communication device. The method includes transferring an authentication key for delivery to a service node, obtaining the geographic location of the wireless communication device, and authenticating the geographic location to create authenticated location information for the wireless communication device. The method also includes wirelessly transferring the authenticated location information to the wireless communication device, wirelessly receiving the authenticated location information from the wireless communication device for delivery to the service node, and transferring the authenticated location information for delivery to the service node, wherein the service node processes authenticated location information and the authentication key to identify the geographic location of the wireless communication device.

18 Claims, 6 Drawing Sheets

AUTHENTICATION OF THE GEOGRAPHIC LOCATION OF WIRELESS COMMUNICATION DEVICES

TECHNICAL FIELD

Aspects of the disclosure are related to the field of communications, and in particular, authenticating the geographic location of wireless communication devices in wireless communication networks.

TECHNICAL BACKGROUND

Wireless communication networks typically include wireless communication devices which, via the wireless communication network, communicate with further communication networks and systems. In many examples, the wireless communication networks can determine geographic locations of the wireless communication devices, or the wireless communication devices can determine their own geographic location.

Application service providers can utilize the geographic location of wireless communication devices to provide various end-user location-based services. Also, emergency services and law enforcement organizations can utilize the geographic location of wireless communication devices in providing services to the public. Unfortunately, it is possible for the wireless communication devices, or other systems, to falsify and tamper with the geographic locations sent by the wireless communication devices to the service providers. This tampering can lead to false indications of the geographic locations for the wireless communication devices.

Overview

What is disclosed is a method of operating a wireless communication network to authenticate a geographic location of a wireless communication device. The method includes transferring an authentication key for delivery to a service node, obtaining the geographic location of the wireless communication device, and authenticating the geographic location to create authenticated location information for the wireless communication device. The method also includes wirelessly transferring the authenticated location information to the wireless communication device, wirelessly receiving the authenticated location information from the wireless communication device for delivery to the service node, and transferring the authenticated location information for delivery to the service node, wherein the service node processes authenticated location information and the authentication key to identify the geographic location of the wireless communication device.

What is also disclosed is a wireless communication network. The wireless communication network includes a processing node configured to transfer an authentication key for delivery to a service node. The wireless communication network also includes an access node configured to obtain a geographic location of a wireless communication device. The processing node is configured to authenticate the geographic location to create authenticated location information for the wireless communication device. The access node is configured to wirelessly transfer the authenticated location information to the wireless communication device, wirelessly receive the authenticated location information from the wireless communication device for delivery to the service node, and transfer the authenticated location information for delivery to the service node, wherein the service node processes authenticated location information and the authentication key to identify the geographic location of the wireless communication device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
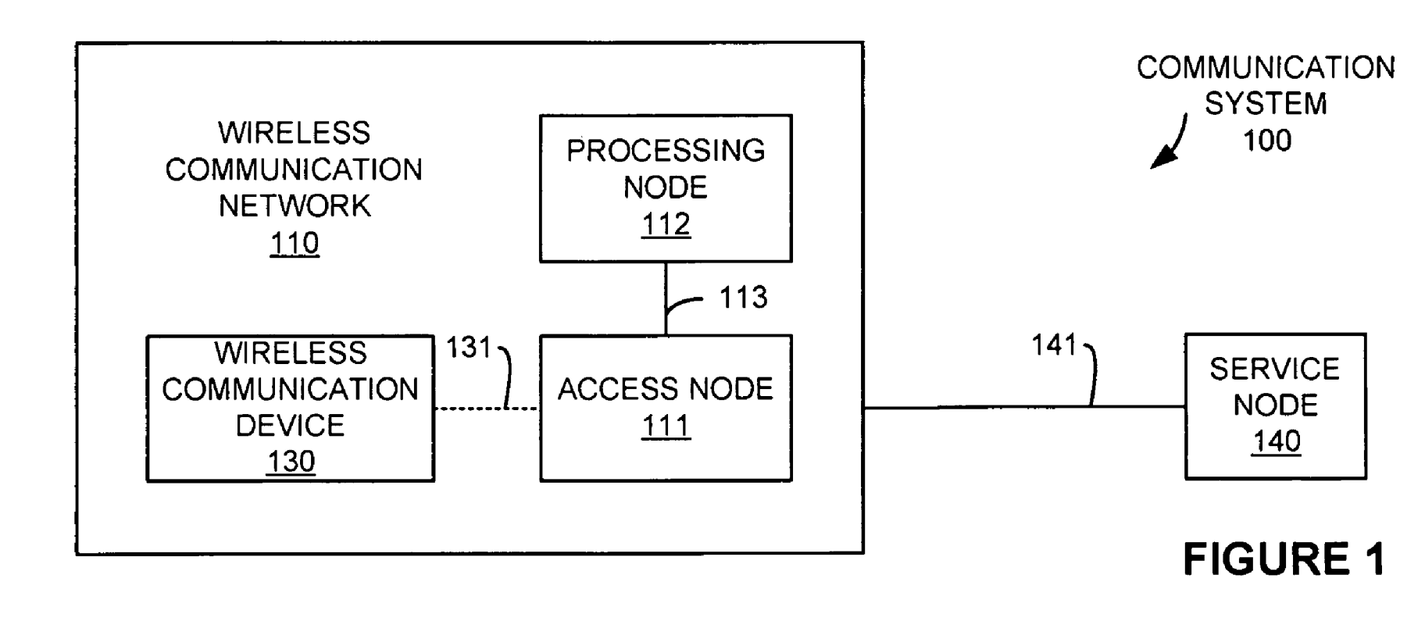
FIG. 1 is a system diagram illustrating a communication system.

FIG. 1 is a system diagram illustrating communication system 100. Communication system 100 includes wireless communication network 110 and service node 140. Wireless communication network 110 and service node 140 communicate over link 141.

Wireless communication network 110 includes access node 111, processing node 112, and wireless communication device 130. Wireless communication device 130 and access node 111 communicate over wireless link 131. Access node 111 and processing node 112 communicate over link 113.

Further examples of wireless communication network 110 can include radio node controllers (RNC), packet data serving nodes (PDSN), authentication, authorization, and accounting (AAA) equipment, mobile switching centers (MSC), call processing equipment, further wireless access nodes, wireless access points, telephone switches, Internet routers, network gateways, as well as other type of communication equipment—including combinations thereof.

Service node 140 includes equipment for utilizing geographic location information of wireless communication device 130. Service node 140 could include an application server, application service provider system, a computer system for hosting end-user applications for wireless communication device 130, emergency services systems, a law enforcement location tracking system, or other systems. In many examples, service node 140 is operated by a different service provider than wireless communication network 110.

Access node 111 includes wireless communications equipment capable of communicating with wireless communication device 130. Examples of access node 111 can include base stations, base transceiver stations, boomer stations, antennas, call processing equipment, wireless access points, Internet routers, network gateways, as well as other type of communication equipment—including combinations thereof. Although only access node 111 is shown in FIG. 1, it should be understood that in other examples more access nodes could be in wireless communication network 110.

Processing node 112 includes equipment for determining and transferring an authentication key associated with communications between wireless communication network 110 and other systems. Processing node 112 also includes equipment for authenticating location information for wireless communication device 130. Processing node 112 could incorporate a computer microprocessor, circuitry, or some other processing device or software system, and may be distributed among multiple processing devices. In some examples, processing node 112 is located within the same equipment as access node 111, while in other examples, processing node 112 is part of core network equipment of wireless communication network 110. Processing node 112 may also include software such as an operating system, logs, utilities, drivers, networking software, and other software stored on a computer-readable medium.

Wireless communication device 130 comprises a telephone, transceiver, computer, digital assistant, smart phone, Internet appliance, or some other wireless communication apparatus—including combinations thereof. Although only wireless communication device 130 is shown in FIG. 1, it should be understood that in other examples more wireless communication devices could be in communication with wireless communication network 110.

Wireless link 131 uses various communication media, such as air, space, or some other wireless transport media—including combinations thereof. Wireless link 131 uses various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), or some other communication format—including combinations, improvements, or variations thereof.

Wireless link 131 may comprise many different signals sharing the same link. Wireless link 131 could include multiple signals operating in a single "airpath"—as represented by the dashed lines in FIG. 1—comprising beacon signals, user communications, communication sessions, overhead communications, frequencies, timeslots, transportation ports, logical transportation links, network sockets, packets, or communication directions. For example, user communications between wireless communication device 130 and access node 111 could share the same representative wireless link 131, but be transferred over different communication sessions, frequencies, timeslots, packets, ports, sockets, logical transport links, or in different directions—including combinations thereof.

Links 113 and 141 use various communication media, such as air, space, metal, optical fiber, or some other signal propagation path—including combinations thereof. Links 113 and 141 could be wired or wireless and use various communication protocols such as Internet, Internet protocol (IP), local-area network (LAN), optical networking, hybrid fiber coax (HFC), telephony, T1, or some other communication format—including combinations or variations thereof. Links 113 and 141 could be direct links or might include various equipment, intermediate components, systems, and networks. Links 113 and 141 could include multiple signals operating in a single pathway in a similar manner as wireless link 131.

Figure 2:
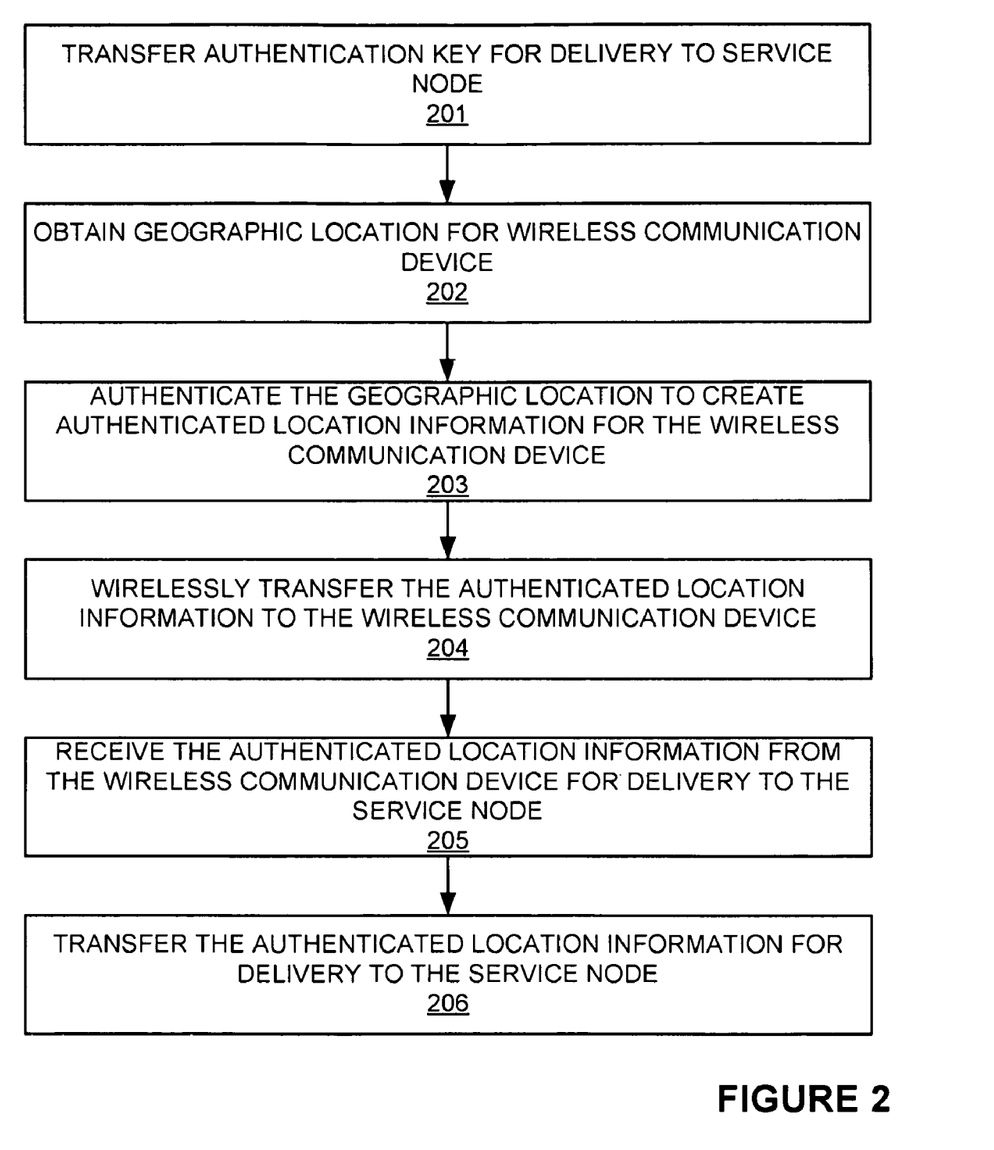
FIG. 2 is a flow diagram illustrating a method of operation of a communication system.

FIG. 2 is a flow diagram illustrating a method of operation of communication system 100, as found in FIG. 1. The operations shown in FIG. 2 are indicated herein parenthetically.

In FIG. 2, processing node 112 transfers (201) an authentication key for delivery to service node 140. In many examples, the authentication key is an encryption key. The authentication key allows another to validate whether data received from wireless communication network 110 is authentic. The authentication key could be used to authenticate data sent from wireless communication network 110 which has been digitally signed by wireless communication network 110. In some examples, processing node 112 determines the authentication key, while in other examples, the authentication key could be determined by a certificate authority or assigned by some other entity.

In examples of an encryption key, the authentication key could be a public key used in an asymmetric public-key cryptography scheme, where data is first encrypted with a private key of wireless communication network 110, and the data is only able to be decrypted with a public key of wireless communication network 110. In other examples, a symmetric secret-key cryptography scheme could be used where the same authentication key is used to encrypt and decrypt the data. It should be understood that other authentication schemes could also be employed.

In some examples, the authentication key is first transferred to a certification authority for later transfer to service node 140. In other examples, the authentication key is transferred by wireless communication network 110 for delivery to service node 140. In examples of where the authentication key is a public encryption key of wireless communication network 110, the authentication key may be transferred through other communication channels and equipment, such as the Internet or other networks before arriving at service node 140.

Access node 111 obtains (202) a geographic location for wireless communication device 130. In some examples, obtaining the geographic location of wireless communication device 130 includes wirelessly receiving the geographic location from wireless communication device 130. Wireless communication device 130 could determine its geographic location by employing a global-positioning system (GPS) receiver, communicating with a global-positioning system, or with other equipment. Wireless communication device 130 could then transfer the geographic location to access node 111 over wireless link 131.

In other examples, obtaining the geographic location of wireless communication device 130 includes determining the geographic location based on a wireless access node serving wireless communication device 130, such as access node 111. Access node 111 could determine that wireless communication device 130 is communicating through access node 111, thus establishing the geographic location of wireless communication device 130 as within the geographic region serviced by access node 111.

In yet other examples, obtaining the geographic location of wireless communication device 130 includes determining the geographic location based on a wireless communication sector containing wireless communication device 130. A sector can represent a particular region of wireless coverage, typically served by a single antenna, antenna array, or base transceiver station of an access node. In many examples, there are multiple sectors associated with a single access node, antenna tower, or base station, with each sector describing a slice of the surrounding geographic region serviced by the access node. Access node 111 could determine the sector that contains wireless communication device 130 by monitoring the sector in which wireless communication device 130 is communicating. The geographic location of wireless communication device 130 would then be correlated to the particular sector of access node 111.

In further examples, obtaining the geographic location of wireless communication device 130 includes determining the geographic location based on contemporaneously receiving wireless signals from wireless communication device 130 in multiple wireless access nodes of wireless communication network 110. Although in FIG. 1, only one access node is shown, in other examples, multiple access nodes could be included in wireless communication network 110. Based upon the properties of the receipt of wireless signals from wireless communication device 130, access node 111 could determine the geographic location of wireless communication device 130.

In other examples, processing node 112 is also employed in obtaining or determining the location of wireless communication device 130. Other methods of determining a geographic location utilizing multiple access nodes could also be employed. These methods could include triangulation, using an emergency services location procedure system, or other methods.

Processing node 112 authenticates (203) the geographic location to create authenticated location information for wireless communication device 130. In many examples, authenticating the geographic location includes both validating the geographic location. In other examples, authenticating the geographic location also includes certifying the geographic location.

Validating the geographic location is done, in some examples, based on a wireless access node serving wireless communication device 130, such as access node 111. Processing node 112 could determine that wireless communication device 130 is communicating through access node 111. The geographic location, as obtained in operation 202, could be determined to be geographically associated with access node 111, thus validating the geographic location of wireless communication device 130 as within the geographic region serviced by wireless communications of access node 111.

In other examples, validating the geographic location is done based on a wireless communication sector containing wireless communication device 130. Processing node 112 could determine the sector that contains wireless communication device 130. The geographic location, as obtained in operation 202, could be determined to be geographically associated with the particular sector of access node 111, thus validating the geographic location of wireless communication device 130 as within the geographic region of the particular sector of access node 111.

In yet other examples, validating the geographic location is done based on contemporaneously receiving wireless signals from wireless communication device 130 in multiple wireless access nodes of wireless communication network 110. Although in FIG. 1, only one access node is shown, in other examples, multiple access nodes could be included in wireless communication network 110. Based upon the properties of the receipt of wireless signals from wireless communication device 130, processing node 112 could determine the geographic location of wireless communication device 130. The geographic location, as obtained in operation 202, could then be validated to be geographically associated with the particular geographic location of wireless communication device 130.

Authenticating the geographic location to create authenticated location information could also include certifying the geographic location. In many examples, certifying the geographic location includes digitally signing the geographic location. In examples of public-key cryptography schemes, the digital signing of the geographic location could be done with a private key for wireless communication network 110. In some examples, the geographic location is processed to determine a hash of the geographic location. The hash could then be encrypted with a private key of wireless communication network 110 and bundled with the geographic location to create the authenticated location information. In other examples, the geographic location is encrypted with a private key of wireless communication network 110. In yet other examples, the geographic location is encrypted with a public key of a recipient of the authenticated location information. This recipient public key could be transferred by the recipient to wireless communication network 110, or could be received from a certification authority. Other schemes could also be employed to ensure the geographic location is not tampered with when passing through unsecure communication channels or equipment. Some certification schemes employ features to prevent tampering, while other schemes employ features to detect tampering, including combinations thereof.

The authenticated location information could also include other information in addition to the geographic location. This additional information could include a timestamp indicating the time of authentication, an identifier of the access node providing wireless communication service to wireless communication device 130, an identifier of wireless communication device 130, or other information, including combinations thereof. This additional information could also be encrypted or digitally signed, as detailed above for the geographic location. In some examples, this additional information can be used to further check the validity of the geographic location.

Access node 111 wirelessly transfers (204) the authenticated location information to wireless communication device 130 over wireless link 131. Wireless communication device 130 may use geographic location information for many purposes. These purposes can include use in user applications or by third parties to determine the geographic location of wireless communication device 130. User applications include mapping software, presence features, business locators, or other geographic location-based applications. Third-party usage includes use by emergency services for medical or rescue purposes, or even by law enforcement systems to track a location of wireless communication device 130.

In many examples, wireless communication device 130 determines its own geographic location, possibly by employing GPS receiver equipment. However, the geographic location as determined by wireless communication device 130, or even received by wireless communication device 130 from another system, could be tampered with. This tampering could include the technique of spoofing, where a geographic location is falsified. This false geographic location could be used to obtain geographically-unauthorized user services or to mislead emergency services or law enforcement officials. Advantageously, since the geographic location information has been verified and certified in the authenticated location information, tampering could be detected and possibly prevented.

Once wireless communication device 130 must use the geographic location for a service, wireless communication device 130 transfers the geographic location. In this example, service node 140 provides a service to wireless communication device 130 which requires the use of a geographic location of wireless communication device 130. Wireless communication device 130 then transfers the authenticated location information for delivery to service node 140.

Access node 111 then receives (205) the authenticated location information from wireless communication device 130 over wireless link 131 for delivery to service node 140. In some examples, only the authenticated location information is transferred for delivery to service node 140, while in other examples, additional information could be included. In further examples, wirelessly receiving the authenticated location information from wireless communication device 130 for delivery to service node 140 includes receiving a data packet, such as an internet protocol (IP) packet, addressed to service node 140. The data packet could include the authenticated location information, among other information. It should be understood that multiple data packets could be employed to transfer the authenticated location information to service node 140.

Access node 111 transfers (206) the authenticated location information for delivery to service node 140. In examples where the authenticated location information is received from wireless communication device 130 in a data packet addressed for service node 140, access node 111 could route the data packet for delivery to service node 140. Further equipment and systems could be employed to route the data packet to service node 140, such as routers, gateways, switches, networks, the Internet, or other systems. Advantageously, in examples where an encryption key has been used to authenticate the geographic location, unsecure or untrusted communication channels and equipment could be employed to transfer the authenticated location information for delivery to service node 140.

In this example, service node 140 could be configured to not authorize the service for wireless communication device 130 without receiving the authenticated location information from wireless communication device 130. Thus, in this example, wireless communication network 110 must first authenticate the geographic location of wireless communication device 130 prior to delivery of the geographic location to service node 140. In other examples, wireless communication network 110 could transfer the authenticated location information for delivery to service node 140 without first transferring the authenticated location information to wireless communication device 130, thus bypassing wireless communication device 130.

In further examples, service node 140 processes the authenticated location information and the authentication key to identify the geographic location of wireless communication device 130. This processing could include checking a digital signature of the authenticated location information using the authentication key. The authentication key could allow service node 140 to determine that the authenticated location information has been validated by a trusted source, such as wireless communication network 110. Also, service node 140 could determine if the authenticated location information has been altered or tampered with after the authentication process in wireless communication network 110. In some examples, service node 140 decrypts the authenticated location information with the authentication key, or with another decryption key to determine the geographic location.

Advantageously, service node 140 could provide a service to wireless communication device 130, such as a geographic location-based user application, a communication service, or other services, based upon authenticated location information. This authenticated location information, and associated geographic location, could be trusted by service node 140 to be authentic.

Figure 3:
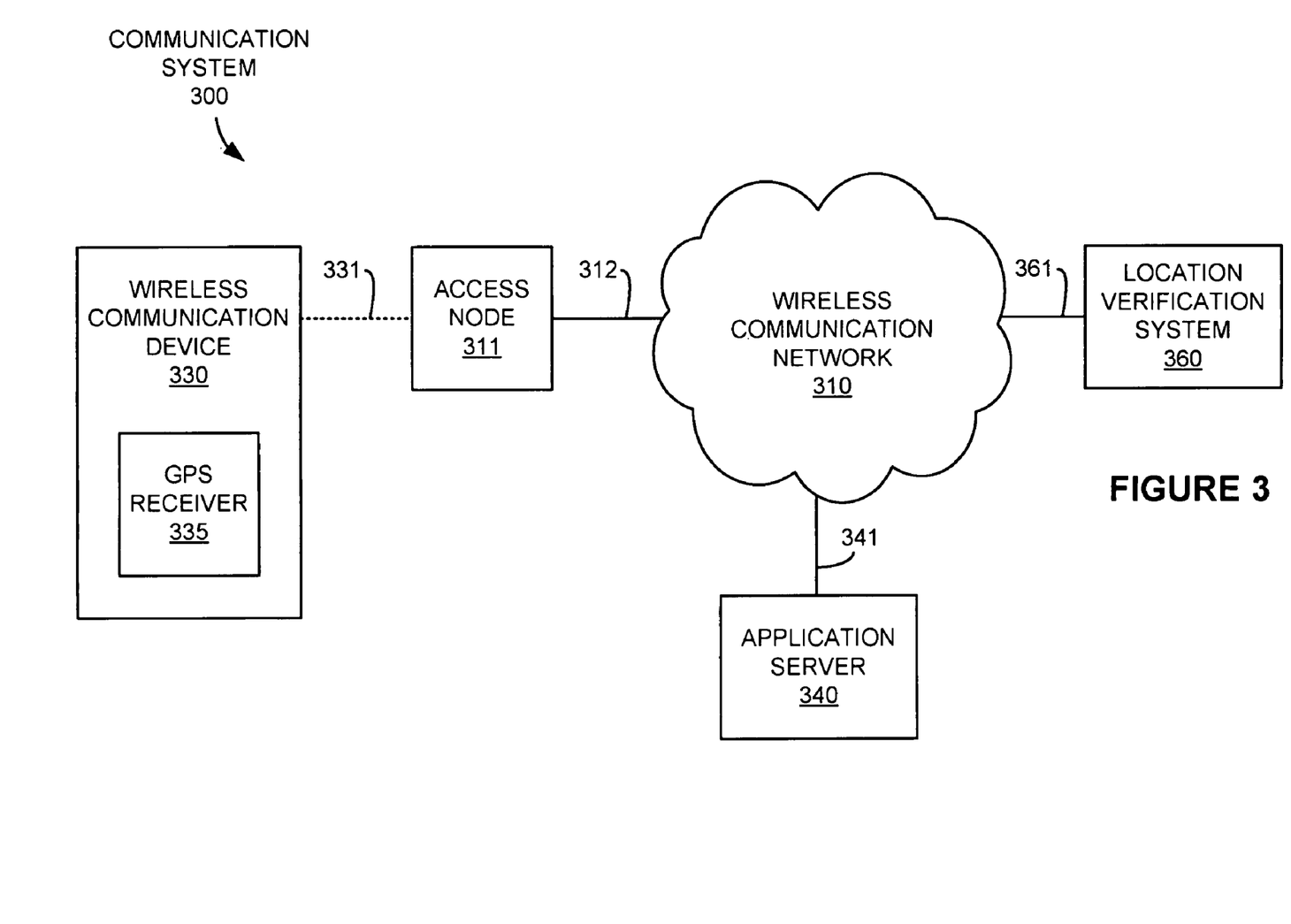
FIG. 3 is a system diagram illustrating a communication system.

FIG. 3 is a system diagram illustrating communication system 300. Communication system 300 includes wireless communication network 310, access node 311, wireless communication device 330, application server 340, and location verification system 360. Wireless communication network 310 and access node 311 communicate over link 312. Wireless communication network 310 and application server 340 communicate over link 341. Wireless communication network 310 and location verification system 360 communicate over link 361. Access node 311 and wireless communication device 330 communicate over wireless link 331.

Wireless communication network 310 includes radio node controllers (RNC), packet data serving nodes (PDSN), authentication, authorization, and accounting (AAA) equipment, mobile switching centers (MSC), call processing equipment, further wireless access nodes, wireless access points, telephone switches, Internet routers, network gateways, as well as other type of communication equipment—including combinations thereof. In many examples, wireless communication network 310 routes communications between application server 340 and wireless communication device 330, as well as communications to and from location verification system 360.

Access node 311 includes wireless communications equipment capable of communicating with wireless communication device 330 over wireless link 331. Examples of access node 311 can include base stations, base transceiver stations, boomer stations, antennas, call processing equipment, wireless access points, Internet routers, network gateways, as well as other type of communication equipment—including combinations thereof. Although only access node 311 is shown in FIG. 3, it should be understood that in other examples more access nodes could be in communication system 300.

Wireless communication device 330 comprises a telephone, transceiver, computer, digital assistant, smart phone, Internet appliance, or some other wireless communication apparatus—including combinations thereof. Although only wireless communication device 330 is shown in FIG. 3, it should be understood that in other examples more wireless communication devices could be in communication system 300.

In the example in FIG. 3, wireless communication device 330 includes global-positioning system (GPS) receiver 335. GPS receiver 335 includes circuitry, processors, or equipment capable of determining a geographic location of mobile communication device 330. GPS receiver 335, in many examples, determines a geographic location by detecting and processing wireless signals from a GPS satellite network to determine a latitude and longitude of a geographic location.

Location verification system 360 includes equipment for determining and transferring an encryption key associated with communications between wireless communication network 310 and other systems. Location verification system 360 also includes equipment for authenticating location information for wireless communication device 330. Location verification system 360 could incorporate a computer microprocessor, circuitry, or some other processing device or software system, and may be distributed among multiple processing devices. In some examples, location verification system 360 is part of core network equipment of wireless communication network 310. Location verification system 360 may also include software such as an operating system, logs, utilities, drivers, networking software, and other software stored on a computer-readable medium.

Application server 340 includes equipment for utilizing geographic location information of wireless communication device 330. Application server 340 could include an application server, application service provider system, a computer system for hosting user applications for wireless communication device 330, or other systems. In many examples, application server 340 is operated by a different service provider than wireless communication network 310.

Wireless link 331 uses various communication media, such as air, space, or some other wireless transport media—including combinations thereof. Wireless link 331 uses various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), or some other communication format—including combinations, improvements, or variations thereof.

Wireless link 331 may comprise many different signals sharing the same link. Wireless link 331 could include multiple signals operating in a single "airpath"—as represented by the dashed lines in FIG. 3—comprising beacon signals, user communications, communication sessions, overhead communications, frequencies, timeslots, transportation ports, logical transportation links, network sockets, packets, or communication directions. For example, user communications between wireless communication device 330 and access node 311 could share the same representative wireless link 331, but be transferred over different communication sessions, frequencies, timeslots, packets, ports, sockets, logical transport links, or in different directions—including combinations thereof.

Links 312, 341, and 361 use various communication media, such as air, space, metal, optical fiber, or some other signal propagation path—including combinations thereof. Links 312, 341, and 361 could each be wired or wireless and use various communication protocols such as Internet, Internet protocol (IP), local-area network (LAN), optical networking, hybrid fiber coax (HFC), telephony, T1, or some other communication format—including combinations or variations thereof. Links 312, 341, and 361 could be direct links or might include various equipment, intermediate components, systems, and networks. Links 312, 341, and 361 could include multiple signals operating in a single pathway in a similar manner as wireless link 331.

Figure 4:
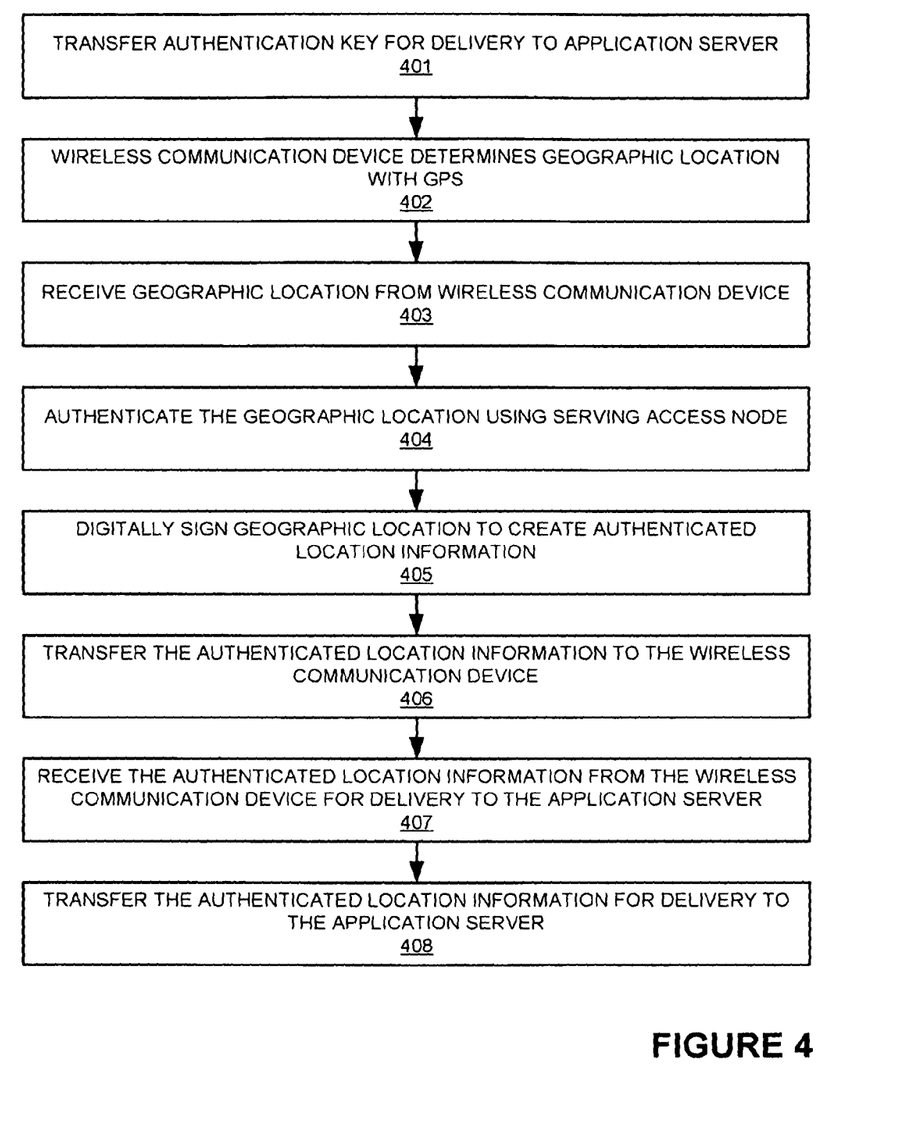
FIG. 4 is a flow diagram illustrating a method of operation of a communication system.

FIG. 4 is a flow diagram illustrating a method of operation of communication system 300, as found in FIG. 3. The operations shown in FIG. 4 are indicated herein parenthetically.

In FIG. 4, location verification system 360 transfers (401) an authentication key for delivery to application server 340. In this example, the authentication key is an encryption key. The authentication key allows application server 340 to validate whether data received from wireless communication network 310 is authentic. The authentication key could be used to authenticate data sent through wireless communication network 310 which has been digitally signed by location verification system 360. Also in this example, the authentication key is a public key used in an asymmetric public-key cryptography scheme, where data is first encrypted with a private key of location verification system 360, and the data is only able to be decrypted with a public key of location verification system 360. In some examples, the authentication key is first transferred to a third-party certification authority, or provided by a third-party certification authority and subsequently transferred for delivery to application server 340. It should be understood that other authentication schemes could also be employed.

Wireless communication device 330 determines (402) its geographic location with GPS receiver 335. GPS receiver 335, in this example, determines a geographic location by detecting and processing wireless signals from a GPS satellite network to determine a latitude and longitude of a geographic location. Unfortunately, in many examples, the geographic location information could also be fabricated by wireless communication device 330 or a user of wireless communication device 330 to create a false geographic location of wireless communication device 330. In this manner, a geographic location of wireless communication device 330 could be tampered with so that wireless communication device 330 appears to be associated with another geographic location, apart from the real location of wireless communication device 330.

Location verification system 360 receives (403) the geographic information from wireless communication device 330. Location verification system 360 receives this geographic information over wireless communication network 310 through access node 311. In some examples, the geographic location is transferred in an IP packet, or multiple packets, over wireless communication network 310.

Location verification system 360 authenticates (404) the geographic location using the serving access node. The serving access node is the access node through which wireless communication device 330 is communicating. In this example, the serving access node is access node 311, where wireless communication device 330 is communicating over wireless link 331 with access node 311. Location verification system 360 could receive access node information, such as an access node identifier, base station identifier (BSID), information about the wireless coverage area of access node 311, or other information from access node 311 or wireless communication network 310. Location verification system 360 then processes the geographic location and the access node information to determine if the geographic location is associated with the serving access node, namely access node 311. If the geographic location is associated with access node 311, then the geographic location received from wireless communication device 330 is determined to be authentic. However, if the geographic location is not associated with access node 311, then the geographic location could have been altered or tampered with by wireless communication device 330 or another system.

If the geographic location is authentic, then location verification system 360 digitally signs (405) the authenticated location information to create authenticated location information for wireless communication device 330. The geographic location of wireless communication device 330 as well as other information could be included in the authenticated location information, including a timestamp of the time that the access node information was authenticated, an identifier of wireless communication device 330, or other information. In this example, since the authentication key is a public key used in an asymmetric public-key cryptography scheme, the geographic location and any additional information are digitally signed with a private key of location verification system 360, or of wireless communication network 310. Also in this example, the digital signing includes generating a hash of the geographic location, along with any additional information, and encrypting the hash with the private key of location verification system 360, or of wireless communication network 310, to create the digital signature. This digital signature is then bundled with the geographic location, and any additional information, to create the authenticated location information. In this example, the geographic location, and any additional information, is also encrypted using the private key of location verification system 360, or of wireless communication network 310 when bundled with the digital signature to create the authenticated location information.

Location verification system 360 transfers (406) the authenticated location information to wireless communication device 330 over wireless communication network 310 and through access node 311. Wireless communication device 330 then receives the authenticated location information. In typical examples, a determination and transfer of the authenticated location information is triggered by a request for the geographic location of wireless communication device 330. The request could originate in wireless communication device 330 or in application server 340 due to a user application or other location-based service provided to wireless communication device 330 or application server 340.

Access node 311 receives (407) the authenticated location information from wireless communication device 330 for delivery to application server 340. As mentioned above, wireless communication device 330 could transfer the authenticated location information to receive location-based services from application server 340. In this example, wireless communication device 330 transfers the authenticated location information through access node 311 to wireless communication network 310. Also in this example, wireless communication device 330 transfers an Internet-protocol (IP) data packet containing the authenticated location information for delivery to application server 340. The IP packet is addressed to application server 340. It should be understood that the authenticated location information could be transferred and received across multiple IP packets.

Access node 311 transfers (408) the authenticated location information for delivery to application server 340. In this example, access node 311 transfers the authenticated location information over wireless communication network 310. Wireless communication network 310 then transfers the authenticated location information to application server 340. In other examples, the authenticated location information could also be transferred through other networks, systems, or the Internet, to arrive at application server 340.

In further examples, application server 340 processes the authenticated location information and the authentication key to identify the geographic location of wireless communication device 330. As noted above in this example, the authentication key is a public key associated with location verification system 360 or wireless communication network 310. Also, as noted above, the authenticated location information includes a digital signature and an encrypted geographic location, along with possibly additional encrypted information. The encrypted geographic location of the authenticated location information is decrypted with the authentication key, and the decrypted geographic location is processed to determine a first hash. The digital signature of the authenticated location information is also decrypted with the authentication key, and then processed to determine a second hash. The first and second hashes are then compared with each other to determine if the geographic location, along with any additional information included in the authenticated location information, is authentic and has not been tampered with or altered by wireless communication device 330 or another system.

Figure 5:
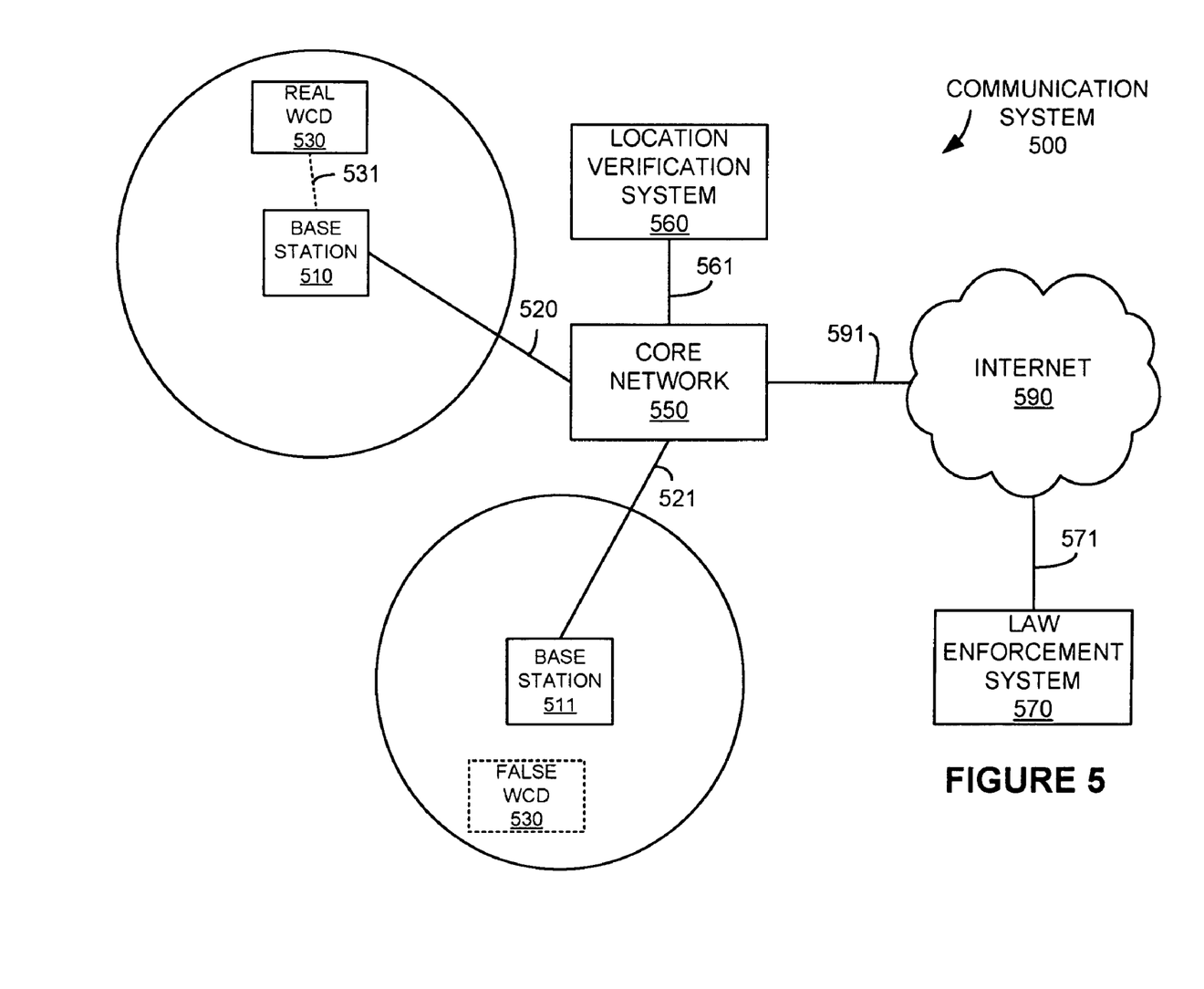
FIG. 5 is a system diagram illustrating a communication system.

FIG. 5 is a system diagram illustrating communication system 500. Communication system 500 includes base stations 510-511, wireless communication device (WCD) 530, core network 550, location verification system 560, law enforcement system 570, and Internet 590. FIG. 5 also shows two locations of WCD 530: Real WCD 530 and False WCD 530.

Base station 510 and WCD 530 communicate over wireless link 531. Base station 510 and core network 550 communicate over link 520. Base station 511 and core network 550 communicate over link 521. Core network 550 and location verification system 560 communicate over link 561. Core network 550 and Internet 590 communicate over link 591. Law enforcement system 570 and Internet 590 communicate over link 571. In this example, links 520-521 are T1 communication links, and links 561, 571, and 591 are optical fiber links capable of transferring communication data packets, although in other examples a different configuration could be utilized. Links 520-521, 561, 571, and 591 could include multiple signals operating in a single pathway in a similar manner as wireless link 331.

Base stations 510-511 each include base station equipment, antennas, transceivers, and other equipment for communicating with and controlling wireless communication devices. Communication system 500 shows base stations 510-511 each situated in a separate circular region of wireless coverage, although in other examples a different number or configuration of base stations may be included. The circular shape should be understood to be merely symbolic of an overhead view of a region of wireless coverage, and should not be interpreted as an exact physical representation of such a region.

In many examples, a region of wireless coverage is served by a single antenna, antenna tower, or base station. Wireless communication devices can be located throughout the regions of wireless coverage. Although WCD 530 is shown in FIG. 5, it should be understood that in various examples of communication system 500, a different number of wireless communication devices could be located in and distributed throughout the various regions of wireless coverage of communication system 500.

WCD 530 comprises a telephone, transceiver, computer, digital assistant, smart phone, Internet appliance, or some other wireless communication apparatus—including combinations thereof. In this example wireless link 531 uses the code division multiple access (CDMA) protocol. Wireless link 531 could include multiple signals operating in a single pathway in a similar manner as wireless link 331.

Core network 550 includes a core network of a communications service provider in this example, comprising telecommunications equipment and networks. In some examples, core network 550 acts as a gateway for communications between base stations 510-511 and further communication systems such as Internet 590, location verification system 540, or other systems. Further examples of core network 550 could include radio node controllers (RNC), packet data serving nodes (PDSN), authentication, authorization, and accounting (AAA) equipment, mobile switching centers (MSC), call processing equipment, further base stations, wireless access points, telephone switches, routers, gateways, as well as other type of communication equipment—including combinations thereof.

Location verification system 560 includes equipment for determining and transferring an encryption key associated with communications between core network 550 and other systems. Location verification system 560 also includes equipment for authenticating location information for wireless communication device 530. Location verification system 560 could incorporate a computer microprocessor, circuitry, or some other processing device or software system, and may be distributed among multiple processing devices. In some examples, location verification system 560 is part of core network 550. Location verification system 560 may also include software such as an operating system, logs, utilities, drivers, networking software, and other software stored on a computer-readable medium.

Law enforcement system 570 includes equipment for utilizing geographic location information of wireless communication device 530. In this example, law enforcement system 570 includes a position tracking system to track the location of a wireless communication device for surveillance purposes.

Figure 6:
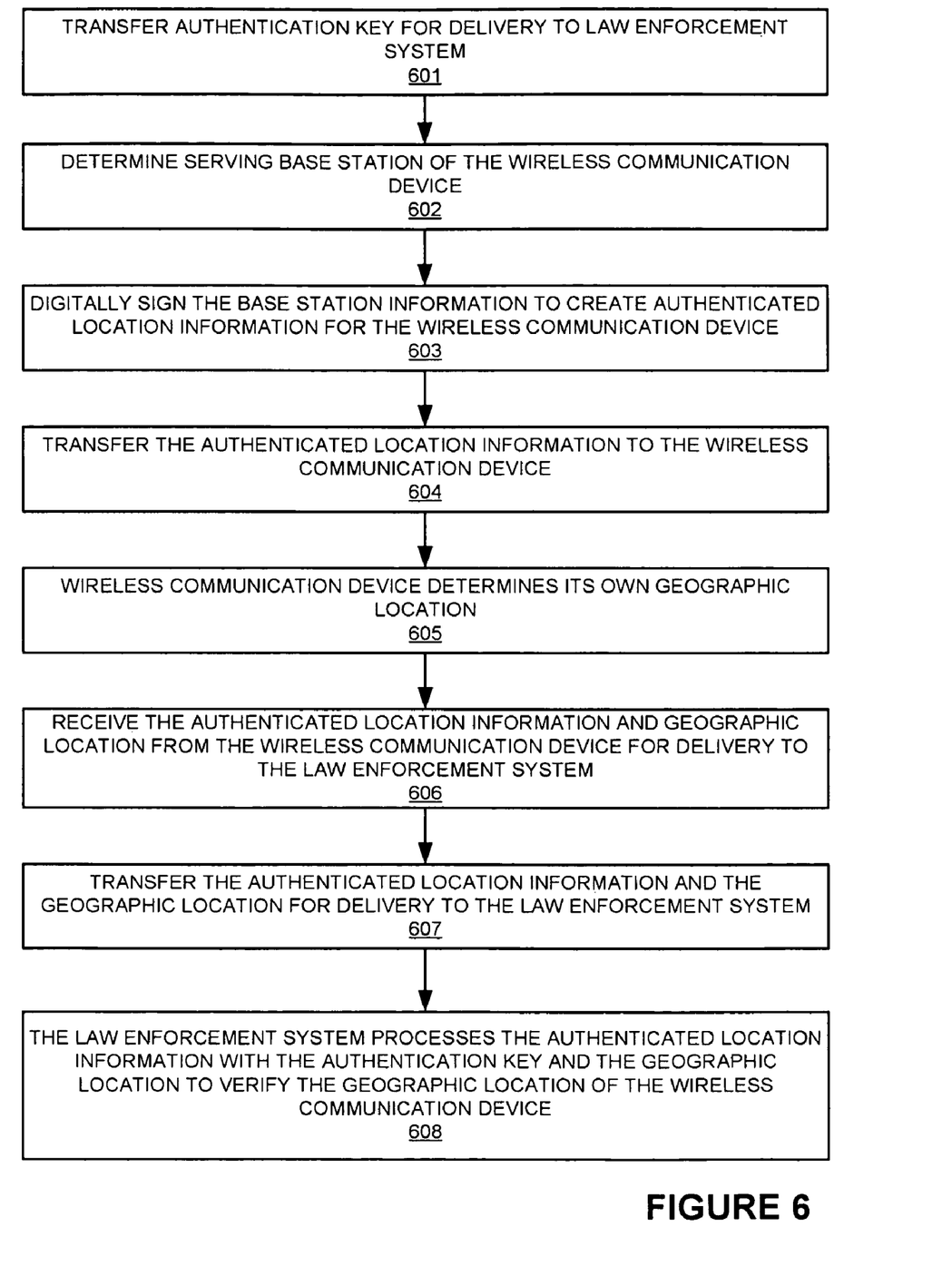
FIG. 6 is a flow diagram illustrating a method of operation of a communication system.

FIG. 6 is a flow diagram illustrating a method of operation of communication system 500, as found in FIG. 5. The operations shown in FIG. 6 are indicated herein parenthetically.

In FIG. 6, location verification system 560 transfers (601) an authentication key for delivery to law enforcement system 570. In this example, the authentication key is a public key used in an asymmetric public-key cryptography scheme, where data is first digitally signed with a private key of location verification system 560, or of core network 550, and the data is only able to be verified as authentic by using a public key of location verification system 560 or of core network 550. Also in this example, the authentication key is transferred through at least core network 550 and Internet 590 to be received at law enforcement system 570.

Location verification system 560 determines (602) the serving base station of wireless communication device (WCD) 530. The serving base station is the base station through which WCD 530 is communicating. In this example, the serving base station is base station 510, where WCD 530 is communicating over wireless link 531 with base station 510. Location verification system 560 could receive base station information, such as the base station identifier (BSID) associated with the serving base station for WCD 530, from base station 510 or core network 550.

Location verification system 560 digitally signs (603) the base station information to create authenticated location information for WCD 530. In this example, since the authentication key is a public key used in an asymmetric public-key cryptography scheme, the base station information is digitally signed with a private key of location verification system 560, or of core network 550. Other information could be included in the base station information, including a timestamp of the time the base station information is authenticated as well as an identifier of WCD 530. Also in this example, the digital signing includes generating a hash of the base station information, along with any additional information, and encrypting the hash with the private key of location verification system 560, or of core network 550 to create the digital signature. This digital signature is then attached to the base station information, and any additional information, to create the authenticated location information. In this example, the base station information, and any additional information, is also encrypted using the private key of location verification system 560, or of core network 550 when attached to the digital signature to create the authenticated location information.

Location verification system 560 transfers (604) the authenticated location information for delivery to WCD 530. In this example, location verification system 560 transfers the authenticated location information to core network 550. Core network 550 then transfers the authenticated location information through base station 510 to WCD 530. In typical examples, a determination and transfer of the authenticated location information is triggered by a request for the geographic location of WCD 530. In this example, the request originates in law enforcement system 570.

WCD 530 determines (605) its own geographic location. In this example, WCD 530 uses a GPS receiver, which is not pictured for clarity in FIG. 5, to determine a geographic location of WCD 530. Unfortunately, in many examples, the geographic location information could also be fabricated by WCD 530 or a user of WCD 530 to create a false geographic location of WCD 530. This is indicated in FIG. 5 as False WCD 530. In some examples, this technique is called spoofing. In this manner, a geographic location of WCD 530 could be tampered with so that WCD 530 appears to be associated with base station 511, or another geographic location, apart from the real location of WCD 530. The real location of WCD 530 is indicated in FIG. 5 by Real WCD 530.

Core network 550 receives (606) the authenticated location information and geographic location from WCD 530 for delivery to law enforcement system 540. In this example, WCD 530 transfers the authenticated location information and geographic location through base station 510 to core network 550. In some examples, the geographic location is encrypted and bundled with the authenticated location information, while in other examples the geographic location is received from WCD 530 separately from the authenticated location information. Also in this example, WCD 530 transfers an Internet-protocol (IP) data packet containing the authenticated location information and the geographic location for delivery to law enforcement system 570. The IP packet is addressed to law enforcement system 570. It should be understood that the authenticated location information and the geographic information could be transferred and received across multiple IP packets. Also in this example, the authenticated location information and the geographic location are transferred from WCD 530 in response to a request for a geographic location of WCD 530 by law enforcement system 570.

Core network 550 transfers (607) the authentication location information and the geographic location for delivery to law enforcement system 570. Since, in this example, the authenticated location information and the geographic location are included in an IP packet, or multiple packets, core network 550 can route the IP packets over Internet 590 for delivery to law enforcement system 570. Advantageously, the pathways the IP packets are routed into and through Internet 590 could be unsecure and untrusted.

Law enforcement system 570 processes (608) the authenticated location information with the authentication key and the geographic location to verify the geographic location of WCD 530. As noted above in this example, the authentication key is a public key associated with location verification system 560 or core network 550. Also, as noted above, the authenticated location information includes a digital signature and encrypted base station information, along with possible additional encrypted information. The encrypted base station information of the authenticated location information is decrypted with the authentication key, and the decrypted base station information is processed to determine a first hash. The digital signature of the authenticated location information is also decrypted with the authentication key, and then processed to determine a second hash. The first and second hashes are then compared with each other to determine if the base station information, along with any additional information included in the authenticated location information, is authentic and has not been tampered with or altered by WCD 530 or another system.

Once the authenticated location information is verified to be authentic, law enforcement system 570 can determine if the geographic location provided by WCD 530 is within the coverage area of base station 510. Advantageously, if the geographic location provided by WCD 530 is determined to not be in the coverage area of base station 510, then law enforcement system 570 could make a reasonable determination that the geographic location has been tampered with or altered, and thus not valid. In an example of a false location, the geographic location provided by WCD 530 could make WCD 530 appear to be located at the location of False WCD 530 in FIG. 5, instead of the location of Real WCD 530.

Moreover, if the geographic location provided by WCD 530 is determined to be within the coverage area of base station 510, the geographic location as provided by WCD 530 could be determined to be the real location of WCD 530, and not altered or tampered with by WCD 530 or another system. Law enforcement system 570 could receive information detailing the coverage area of base station 510 from core network 550, location verification system 560, or other sources.

In this example, law enforcement system 570 is configured to expect the authenticated location information and the geographic location. Advantageously, if both the authenticated location information and the geographic location are not received, law enforcement system 570 cannot authenticate the location of WCD 530, and can determine that the geographic location of WCD 530 cannot be trusted.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication network having a public key and a private key to authenticate a geographic location of a wireless communication device, the method comprising:
   obtaining the geographic location of the wireless communication device and authenticating the geographic location to create authenticated location information for the wireless communication device;
   digitally signing the authenticated location information with the private key for the wireless communication network to create digitally-signed and authenticated location information for the wireless communication device;
   wirelessly transferring the digitally-signed and authenticated location information to the wireless communication device;
   wirelessly receiving the digitally-signed and authenticated location information from the wireless communication device for delivery to a service node; and
   transferring the digitally-signed and authenticated location information for delivery to the service node, wherein the service node processes the digitally-signed and authenticated location information and the public key for the wireless communication network to identify the geographic location of the wireless communication device.

2. The method of claim 1 wherein obtaining the geographic location of the wireless communication device comprises wirelessly receiving the geographic location from the wireless communication device.

3. The method of claim 1 wherein obtaining the geographic location of the wireless communication device comprises determining the geographic location based on a wireless access node serving the wireless communication device.

4. The method of claim 1 wherein obtaining the geographic location of the wireless communication device comprises determining the geographic location based on a wireless communication sector containing the wireless communication device.

5. The method of claim 1 wherein obtaining the geographic location of the wireless communication device comprises determining the geographic location based on contemporaneously receiving wireless signals from the wireless communication device in multiple wireless access nodes of the wireless communication network.

6. The method of claim 1 wherein authenticating the geographic location comprises validating the geographic location based on a wireless access node serving the wireless communication device.

7. The method of claim 1 wherein authenticating the geographic location comprises validating the geographic location based on a wireless communication sector containing the wireless communication device.

8. The method of claim 1 wherein authenticating the geographic location comprises validating the geographic location based on contemporaneously receiving wireless signals from the wireless communication device in multiple wireless access nodes of the wireless communication network.

9. The method of claim 1 wherein wirelessly receiving the digitally-signed and authenticated location information from the wireless communication device for delivery to the service node comprises receiving an internet protocol packet addressed to the service node and including the digitally-signed and authenticated location information.

10. A wireless communication network having a public key and a private key, comprising:
    an access node configured to obtain a geographic location of a wireless communication device;
    a processing node configured to authenticate the geographic location to create authenticated location information for the wireless communication device and to digitally sign the authenticated location information with the private key for the wireless communication network to create digitally-signed and authenticated location information for the wireless communication device;
    the access node configured to wirelessly transfer the digitally-signed and authenticated location information to the wireless communication device; and
    the access node configured to wirelessly receive the digitally-signed and authenticated location information from the wireless communication device for delivery to a service node, and transfer the digitally-signed and authenticated location information for delivery to the service node, wherein the service node processes the digitally-signed and authenticated location information and the public key for the wireless communication network to identify the geographic location of the wireless communication device.

11. The wireless communication network of claim 10, wherein the access node is configured to wirelessly receive the geographic location from the wireless communication device.

12. The wireless communication network of claim 10, wherein the access node is configured to determine the geographic location based on a wireless access node serving the wireless communication device.

13. The wireless communication network of claim 10, wherein the processing node is configured to determine the geographic location based on a wireless communication sector containing the wireless communication device.

14. The wireless communication network of claim 10, further comprising:
    multiple access nodes configured to receive wireless signals from the wireless communication device; and
    wherein the processing node is configured to determine the geographic location based on contemporaneously receiving wireless signals from the wireless communication device in the multiple access nodes.

15. The wireless communication network of claim 10, wherein the processing node is configured to authenticate the geographic location by validating the geographic location based on a wireless access node serving the wireless communication device.

16. The wireless communication network of claim 10, wherein the processing node is configured to authenticate the geographic location by validating the geographic location based on a wireless communication sector containing the wireless communication device.

17. The wireless communication network of claim 10, further comprising:
multiple access nodes configured to receive wireless signals from the wireless communication device; and
wherein the processing node is configured to authenticate the geographic location by validating the geographic location based on contemporaneously receiving wireless signals from the wireless communication device in the multiple wireless access nodes.

18. The wireless communication network of claim 10, wherein the access node is configured to wirelessly receive the digitally-signed and authenticated location information from the wireless communication device for delivery to the service node by receiving an internet protocol packet addressed to the service node and including the digitally-signed and authenticated location information.

* * * * *